(12) United States Patent
Shah et al.

(10) Patent No.: US 9,225,517 B2
(45) Date of Patent: Dec. 29, 2015

(54) SECURE DEVICE ASSOCIATION

(75) Inventors: Rahul C. Shah, San Francisco, CA (US); Lama Nachman, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 2067 days.

(21) Appl. No.: 12/242,404

(22) Filed: Sep. 30, 2008

(65) Prior Publication Data

US 2010/0082983 A1    Apr. 1, 2010

(51) Int. Cl.
| | |
|---|---|
| *H04L 9/32* | (2006.01) |
| *H04L 9/08* | (2006.01) |
| *H04L 29/06* | (2006.01) |
| *H04W 12/04* | (2009.01) |

(52) U.S. Cl.
CPC ............ *H04L 9/0827* (2013.01); *H04L 9/0838* (2013.01); *H04L 63/061* (2013.01); *H04L 63/18* (2013.01); *H04W 12/04* (2013.01); *H04L 2209/805* (2013.01)

(58) Field of Classification Search
USPC ........................................................ 713/169
See application file for complete search history.

(56) References Cited

U.S. PATENT DOCUMENTS

| | | | | |
|---|---|---|---|---|
| 5,656,779 | A * | 8/1997 | Bronowicki ..................... | 73/668 |
| 7,190,264 | B2 * | 3/2007 | Brown et al. ............ | 340/539.23 |
| 7,295,112 | B2 * | 11/2007 | Bowser et al. ............. | 340/568.1 |
| 7,310,742 | B2 * | 12/2007 | Zimmer et al. .............. | 714/5.11 |
| 7,461,192 | B2 * | 12/2008 | Sobelman ..................... | 710/305 |
| 7,865,647 | B2 * | 1/2011 | Jacob ............................ | 710/244 |
| 2004/0137845 | A1 * | 7/2004 | Vonheim et al. ............. | 455/41.2 |
| 2006/0120397 | A1 * | 6/2006 | Kreiner et al. ................ | 370/437 |
| 2007/0132733 | A1 * | 6/2007 | Ram ............................ | 345/163 |
| 2008/0104394 | A1 | 5/2008 | Want et al. | |
| 2008/0162937 | A1 | 7/2008 | Kohlenberg et al. | |

OTHER PUBLICATIONS

Mayrhofer, Rene et al., "Shake Well Before Use: Authentication Based on Accelerometer Data", Pervasive 2007, LNCS 4480, (2007), pp. 144-161.

Holmquist, Lars E., et al., "Smart-Its Friends: A Technique for Users to Easily Establish Connections between Smart Artefacts", Ubicomp 2001, LNCS 2201, (2001), pp. 116-122.

Castelluccia, Claude et al., "Shake Them Up! A movement-based pairing protocol for CPU-constrained devices", MobiSys '05: The Third International Conference on Mobile Systems, Applications, and Services, (2005), pp. 51-64.

Hinckley, Ken et al., "Bumping Objects Together as a Semantically Rich Way of Forming Connections between Ubiquitous Devices", Ubicomp, (2003), 2 pages.

Lester, Jonathan et al., "Are You With Me?"—Using Accelerometers to Determine if Two Devices are Carried by the Same Person, Pervasive Computing, vol. 3001/2004, (2004), pp. 33-50.

Deisher, Michael E., "Handheld Device Association Via Shared Vibration", U.S. Appl. No. 11/967,894, filed Dec. 31, 2007.

(Continued)

*Primary Examiner* — Esther B Henderson
(74) *Attorney, Agent, or Firm* — Alpine Technology Law Group LLC

(57) ABSTRACT

Secure device association is generally described. In one example, a secure device association system comprises a first device comprising a mechanical actuator and a second device comprising a microphone, the mechanical actuator of the first device and the microphone of the second device to form an out-of-band (OOB) channel for secure association between the first device and the second device.

14 Claims, 4 Drawing Sheets

(56) References Cited

OTHER PUBLICATIONS

Shah, Rahul C., et al., "Secure Association Between Devices", U.S. Appl. No. 11/967,149, filed Dec. 29, 2007.

Shah, Rahul C., et al., "System and Method for Physiological Data Authentication and Bundling With Delayed Binding of Individual Identification", U.S. Appl. No. 11/851,530, filed Sep. 7, 2007.

Shah, Rahul C., et al., "Secure Association Between Devices", U.S. Appl. No. 11/968,077, filed Dec. 31, 2007.

* cited by examiner

SECURE DEVICE ASSOCIATION

TECHNICAL FIELD

Embodiments disclosed herein are generally directed to the field of electronics. More particularly, embodiments herein generally relate to secure device association.

BACKGROUND

Generally, secure association of devices is an important part of network security for a variety of applications including, for example, personal health and entertainment networks. Secure association may refer to the secure exchange of information between two or more devices to generate a common key for encrypting data sent over insecure links, such as wireless networks. Encryption may be used to prevent eavesdropping or tampering of the data during transmission between, for example, a sensor and aggregator. Secure association may ensure that encryption keys are distributed only between devices that wish to communicate, and not to unintended parties.

BRIEF DESCRIPTION OF THE DRAWINGS

Embodiments disclosed herein are illustrated by way of example, and not by way of limitation, in the figures of the accompanying drawings in which like reference numerals refer to similar elements and in which.

Figure 1:
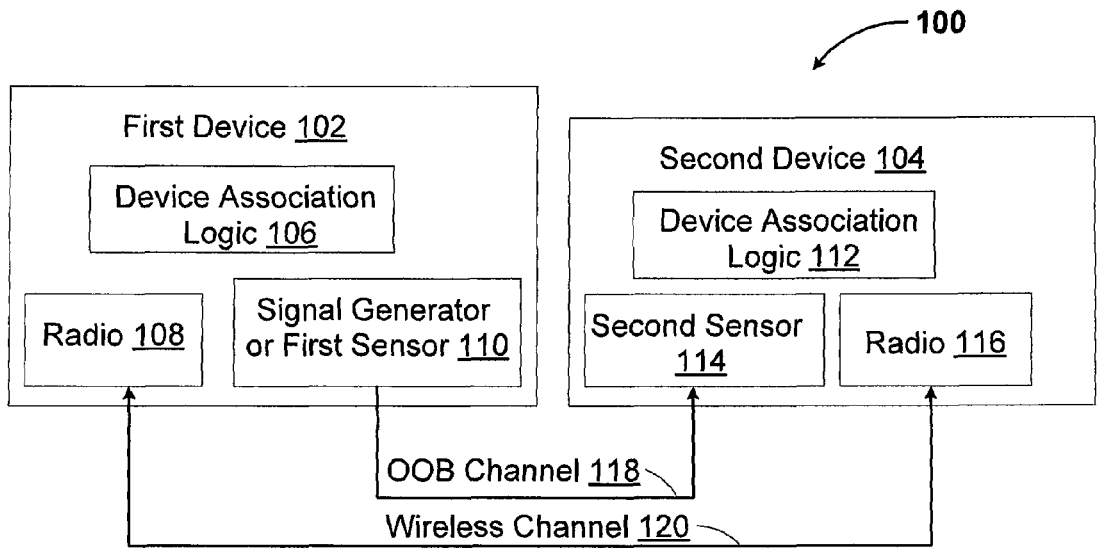
FIG. 1 is a block diagram of secure device association, according to but one embodiment.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

Embodiments of secure device association are described herein. In the following description, numerous specific details are set forth to provide a thorough understanding of embodiments disclosed herein. One skilled in the relevant art will recognize, however, that the embodiments disclosed herein can be practiced without one or more of the specific details, or with other methods, components, materials, and so forth. In other instances, well-known structures, materials, or operations are not shown or described in detail to avoid obscuring aspects of the specification.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

FIG. 1 is a block diagram of secure device association, according to but one embodiment. In an embodiment, a secure device association system 100 comprises a first device 102 comprising device association logic 106, radio 108, and signal generator 110 or first sensor 110. A second device 104 may comprise device association logic 112, second sensor 114, and radio 116. System 100 may further comprise an out-of-band (OOB) channel formed between the signal generator 110 or first sensor 110 and the second sensor 114 and a wireless channel 120 may be formed between the radios 108, 116 of the first device 102 and the second device 104.

Embodiments herein may allow secure association between at least a first device 102 and a second device 104. Secure association may allow the secure exchange of information between first device 102 and second device 104 to generate a common key for encrypting data sent between the devices 102, 104. The encrypted data may be sent over insecure links, such as a wireless channel 120 in an embodiment.

A secure device association system 100 may be used in a variety of applications. In personal medical networks, for example, sensors 110 on a body may send sensed medical data to an aggregation device 104, such as a personal digital assistant (PDA), mobile intelligent device (MID), personal computer (PC), or other electronic device using wireless communications 120. To prevent eavesdropping or tampering of the data during transmission between the sensor and the aggregator, some form of encryption may be required such as, for example, Advanced Encryption Standard (AES), although not limited in this regard. AES refers to the standard announced by National Institute of Standards and Technology (NIST) as U.S. FIPS PUB 197 (FIPS 197) on Nov. 26, 2001, effective May 26, 2002. A secure device association system may ensure that encryption keys are distributed only between the devices 102, 104 that are to communicate and not to unintended devices. Other fields, such as entertainment, education, mobile computing, or telecommunications, or combinations thereof, may similarly benefit from secure device association to securely transfer data between devices 102, 104. Application is not limited to such fields and may be used in a variety of other fields in various embodiments.

An out-of-band (OOB) channel 118 may be used to securely associate a first device 102 and a second device 104. In an embodiment, OOB channel 118 may be secure from third-party or other unwanted tampering because a user may typically bring the first device 102 and the second device 104 close to each other during the setup process. The range of signal generation or sensing 110, 114 between the first device 102 and second device 104 may be limited by distance. Further, a user may verify that no other devices affect the secure association process.

In an embodiment, system 100 includes a first device 102 comprising a signal generator or a first sensor 110 and a second device 104 comprising a second sensor 114, the signal generator or the first sensor 110 and the second sensor 114 to form an OOB channel 118 for secure association between the first device 102 and the second device 104. The OOB channel 118 may allow secure exchange of information between the first device 102 and the second device 104 to generate a common key for encrypting data to be transferred between the first device 102 and the second device 104.

Embodiments herein may use signal generators 110 and/or sensors 110, 114 that may be present on existing devices 102, 104 to support other existing applications, thus reducing the cost for additional hardware to the system 100. Furthermore, embodiments herein may allow creation of OOB channels without requiring the use of Near Field Communications (NFC) radios or display and keyboard combinations to securely exchange data, although embodiments may include such features. System 100 may easily integrate into existing secure association techniques used in conformance with an Institute of Electrical and Electronics Engineers (IEEE) standard, such as IEEE 802.11b and/or IEEE 802.11g standards, and/or by conforming to Bluetooth standards. Other wireless network protocols may also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999, as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003, as well as related documents. Subsequent versions of the IEEE 802.11b and/or IEEE 802.11g standards may also be supported. Bluetooth protocols are described in "Specification of the Bluetooth System: Core, Version 1.1," published Feb. 22, 2001, by the Bluetooth Special Interest Group, Inc. Previous or subsequent versions of the Bluetooth standard may also be supported.

First device 102 and second device 104 may comprise radios 108 and 116, respectively, for primary communications and/or transfer of data using, for example, a wireless channel 120, which may or may not be secured. Radios 108 and 116 may be used, for example, to exchange discovery information between the first 102 and second device 104. First device 102 and second device 104 may further comprise device association logic 106 and 112, respectively. Device association logic 106, 112 may cause exchange of information between the devices 102, 104 via wireless channel 120 during operations described further with respect to FIG. 4.

First device 102 may comprise a signal generator or first sensor 110 and second device 104 may comprise a second sensor 114. Multiple signal generators or first sensors 110 or second sensors 114 may be used in one or more embodiments. In an embodiment, a signal generator 110 may comprise a mechanical actuator, such as a vibration actuator 210 described further with respect to FIG. 2. In another embodiment, a first sensor 110 may comprise an accelerometer 310 described with respect to FIG. 3. Second sensor 114 may comprise a microphone 214, 314 as described with respect to FIGS. 2 and 3. Other sensors 110, 114 or signal generators 110 may be used in other embodiments.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Subsequent versions of the IEEE 802.11b and/or IEEE 802.11g standards may also be supported. Bluetooth protocols are described in "Specification of the Bluetooth System: Core, Version 1.1," published Feb. 22, 2001 by the Bluetooth Special Interest Group, Inc. Previous or subsequent versions of the Bluetooth standard may also be supported.

First device 102 and second device 104 may comprise radios 108 and 116, respectively, for primary communications and/or transfer of data using, for example, a wireless channel 120, which may or may not be secured. Radios 108 and 116 may be used, for example to exchange discovery information between the first 102 and second device 104. First device 102 and second device 104 may further comprise device association logic 106 and 112, respectively. Device association logic 106, 112 may cause exchange of information between the devices 102, 104 via wireless channel 120 during operations described further with respect to FIG. 4.

First device 102 may comprise a signal generator or first sensor 110 and second device 104 may comprise a second sensor 114. Multiple signal generators or first sensors 110 or second sensors 114 may be used in one or more embodiments. In an embodiment, a signal generator 110 may comprise a mechanical actuator such as a vibration actuator 210 described further with respect to FIG. 2. In another embodiment, a first sensor 110 may comprise an accelerometer 310 described with respect to FIG. 3. Second sensor 114 may comprise a microphone 214, 314 as described with respect to FIGS. 2 and 3. Other sensors 110, 114 or signal generators 110 may be used in other embodiments.

Figure 2:
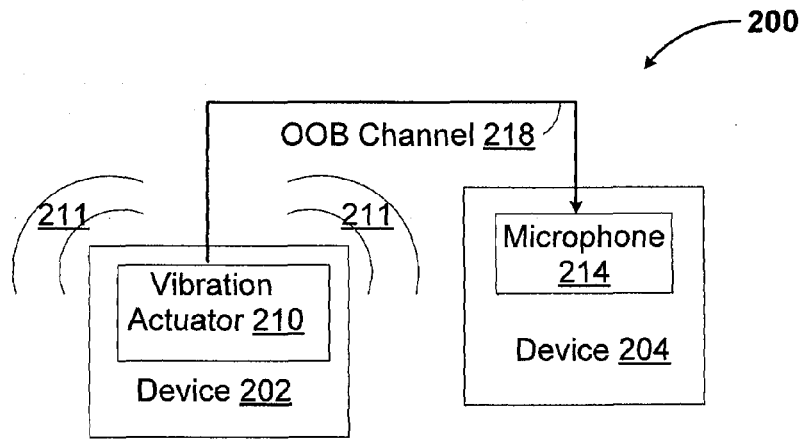
FIG. 2 is a block diagram of forming an out-of-band channel using a vibration actuator and a microphone, according to but one embodiment.

FIG. 2 is a block diagram of forming an out-of-band (OOB) channel using a vibration actuator and a microphone, according to but one embodiment. In an embodiment, a secure device association system 200 comprises a first device 202 comprising a vibration actuator 210 and a second device 204 comprising a microphone 214. An OOB channel 218 may be formed between the vibration actuator 210 of the first device 202 and the microphone 214 of the second device 204.

In an embodiment, vibration actuator 210 is a signal generator and microphone 214 is a sensor. The microphone 214 may sense vibrations 211 created by the vibration actuator 210 when the devices 202, 204 are held in proximity to one another. In an embodiment, the vibration actuator 210 and the microphone 214 are in sufficiently close proximity to one another to form a shared secret by sending one or more pulses 211 from the vibration actuator 210 and detecting the one or more pulses using the microphone 214. In another embodiment, vibration actuator 10 and microphone 214 are in sufficiently close proximity to one another to authenticate the first device 202 or the second device 204. In another embodiment, a microphone 214 greater than, for example, two feet away from the vibration actuator 210 does not sense the vibrations allowing for greater security from third party intervention. The vibration actuator 210 may send periodic pulses in an embodiment. The second device 204 may receive the vibration pulse 211 out-of-band by, for example, decoding the pulses in a manner similar to an acoustic modem. The second device 204 may use the information obtained from the vibration pulse 211 to establish an authentic communication endpoint.

Usage models of system 200 may include, for example, pairing a cell phone 202 and a headset 204. Many cell phones may have a vibration actuator 210 already and headsets may have a microphone 214. Other usages may be applied in other embodiments. For example, secure device association as described herein may make use of hardware already present on activity sensors, multi-sensor platforms, electrocardiogram (EKG) sensors, or other devices such as, for example, Sensing Health with Intelligence, Modularity, Mobility, and Experimental Reusability (SHIMMER) devices, or pulse oximetry sensors such as, for example, Ear-SHIMMER, or combinations thereof. A SHIMMER device may be a wearable mote that may comprise a processor, radio, accelerometer, rechargeable battery, and/or flash memory.

Figure 3:
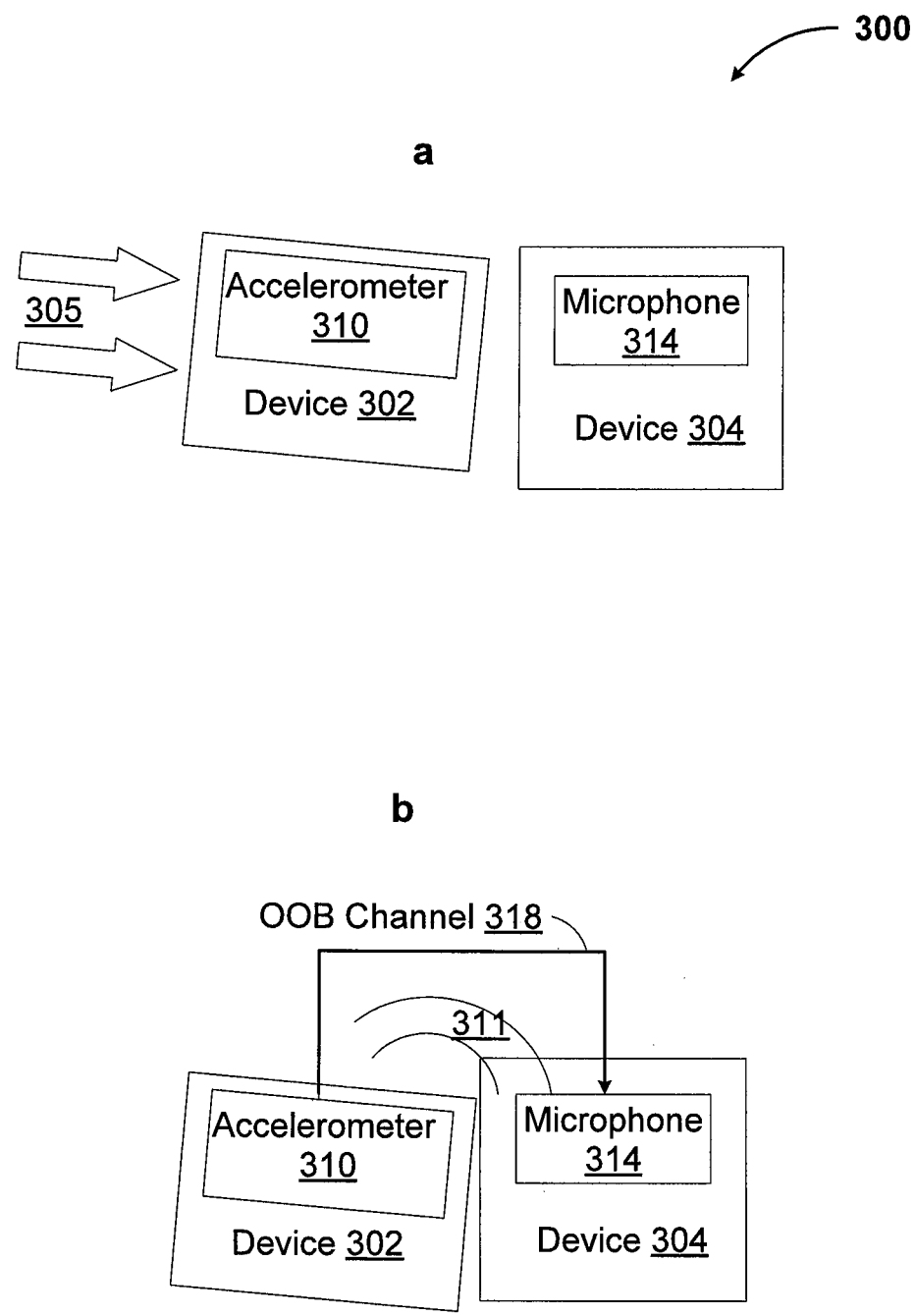
FIG. 3 is a block diagram of forming an out-of-band channel using an accelerometer and a microphone, according to but one embodiment.

FIG. 3 is a block diagram of forming an out-of-band channel using an accelerometer and a microphone, according to but one embodiment. In an embodiment, a secure device association system 300 comprises a first device 302 comprising an accelerometer 310 and a second device 304 comprising a microphone 314. An OOB channel 318 may be formed between the accelerometer 310 of the first device 302 and the microphone 314 of the second device 304. FIG. 3a and FIG. 3b may depict forming a shared secret or authentication between the accelerometer 310 and the microphone 314 by bumping the accelerometer 310 and the microphone 314 together one or more times. Bumping the devices 302, 304 may be one approach according to one embodiment.

In other embodiments, other actuation approaches may be used to allow first device 302 and second device 304 detect a common event. A variety of signals may be generated that may be sensed by an accelerometer 310 and a microphone 314 for forming a shared secret or authentication. A vibration, for example, from a phone may be detected by an earpiece 304 comprising a microphone 314 and another device 302 comprising an accelerometer 310 in an embodiment. The generated signal may be limited in range such that only devices in close proximity are able to sense the generated signal. Other generated signals may be used in other embodiments.

In an embodiment according to FIG. 3a, a first device 302 is brought into contact with the second device 304 with sufficient force 305 such that the accelerometer 310 and the microphone 314 sense the bump. In an embodiment according to FIG. 3b, bumping the first device 302 and the second device 304 together registers on the accelerometer due to the sudden deceleration and registers on the microphone due to the sound or vibration 311 of the bump. Similarly, in another embodiment, the first device 302 may be bumped against a surface or object sufficiently proximate to the microphone 314 to be sensed by the accelerometer 310 and the microphone 314. The timing of the sensed one or more bumps may be used to form a shared secret or authentication to allow secure association of the first device 302 and the second device 304.

Usage models of system 300 may include, for example, pairing a medical device 302, such as SHIMMER, a multi-sensor platform (MSP), or an entertainment device like a game controller 302 comprising an accelerometer 310 with a second device 304 comprising a microphone 314, such as a cell phone or a headset. Other usages may be applied in other embodiments. For example, secure device association as described herein may make use of hardware already present on activity sensors, multi-sensor platforms, electrocardiogram (EKG) sensors, such as, for example, SHIMMER, or pulse oximetry sensors, such as, for example, Ear-SHIMMER, or combinations thereof.

Figure 4:
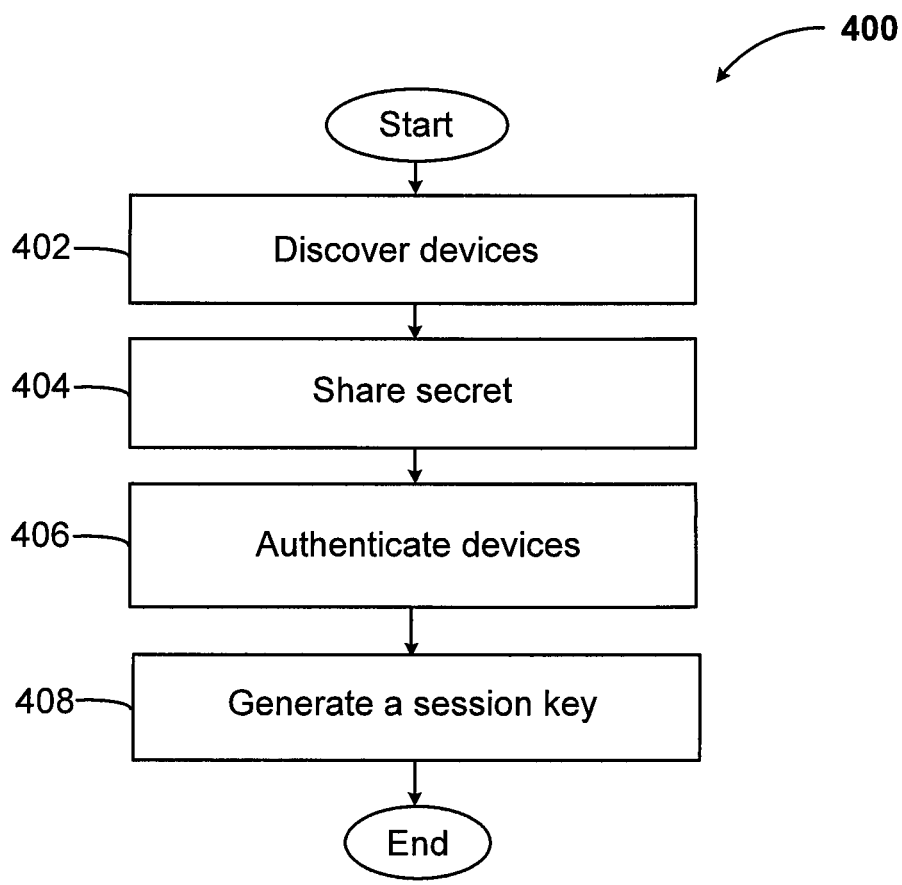
FIG. 4 is a process flow diagram of a method to provide secure device association, according to but one embodiment.

FIG. 4 is a process flow diagram of a method to provide secure device association, according to but one embodiment. In an embodiment, method 400 comprises discovering devices 402, sharing a secret 404, authenticating the devices 406, and generating a session key 408.

Discovering devices 402 may comprise exchanging discovery information between a first device and a second device. For example, device association logic of the first device and/or second device may cause exchange of information via a wireless communication channel. The first and second device may discover each other 402 and exchange information about capabilities of the respective devices to begin the association process. Radios on the devices may be used to exchange the discovery information.

Establishing a shared secret 404 between the first device and the second device may comprise using an OOB channel formed between the first and second device. In an embodiment, the OOB channel is formed between a signal generator or first sensor of the first device and a second sensor of the second device. The signal generator may comprise a vibration actuator and the second sensor may comprise a microphone in one embodiment. In such embodiment, the vibration actuator and the microphone may be in sufficiently close proximity to one another to form the OOB channel by sending one or more pulses from the vibration actuator and detecting the one or more pulses using the microphone. In another embodiment, the first sensor comprises an accelerometer and the second sensor comprises a microphone. In such embodiment, the accelerometer and the microphone form the OOB channel by bumping the accelerometer and the microphone together or sufficiently near one another, or combinations thereof, one or more times. Other generated signals to be sensed by the accelerometer and microphone may be used in other embodiments.

In other embodiments, establishing a shared secret 404 may be accomplished using radios of the first and second devices. A shared secret 404 may be exchanged securely using, for example, a Diffie-Hellman algorithm or similar technique. Device association logic may implement the algorithm or similar technique.

Authenticating a first device or second device 406 may comprise using an OOB channel formed between the first device and the second device. Authentication 406 may verify by using the device association logic, for example, whether the information exchanged in establishing a shared secret 404 was with the same device. In an embodiment, the OOB channel is formed between a signal generator or first sensor of the first device and a second sensor of the second device. The signal generator may comprise a vibration actuator and the second sensor may comprise a microphone in one embodiment. In such embodiment, the vibration actuator and the microphone may be in sufficiently close proximity to one another to form the OOB channel by sending one or more pulses from the vibration actuator and detecting the one or more pulses using the microphone. In another embodiment, the first sensor comprises an accelerometer and the second sensor comprises a microphone. In such embodiment, the accelerometer and the microphone form the OOB channel by bumping the accelerometer and the microphone together or sufficiently near one another, or combinations thereof, one or more times. Establishing the shared secret 404 or authenticating the devices 406, or combinations thereof, may comprise using the OOB channel formed according to embodiments herein.

Method 400 may further include generating a session key 408 to encrypt data transferred between the first device and the second device. Using information exchanged between the devices in establishing a shared secret 404 and/or authenticating the devices 406, the first device and the second device through, for example, device association logic can generate identical symmetric encryption keys 408 to encrypt the data. The data transferred between the first device and the second device may be over a wireless channel and may comprise healthcare related data, entertainment related data, education related data, mobile computing related data, or telecommunication related data, or combinations thereof.

Various operations may be described as multiple discrete operations in turn, in a manner that is most helpful in understanding the claimed subject matter. The order of description should not, however, be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

Figure 5:
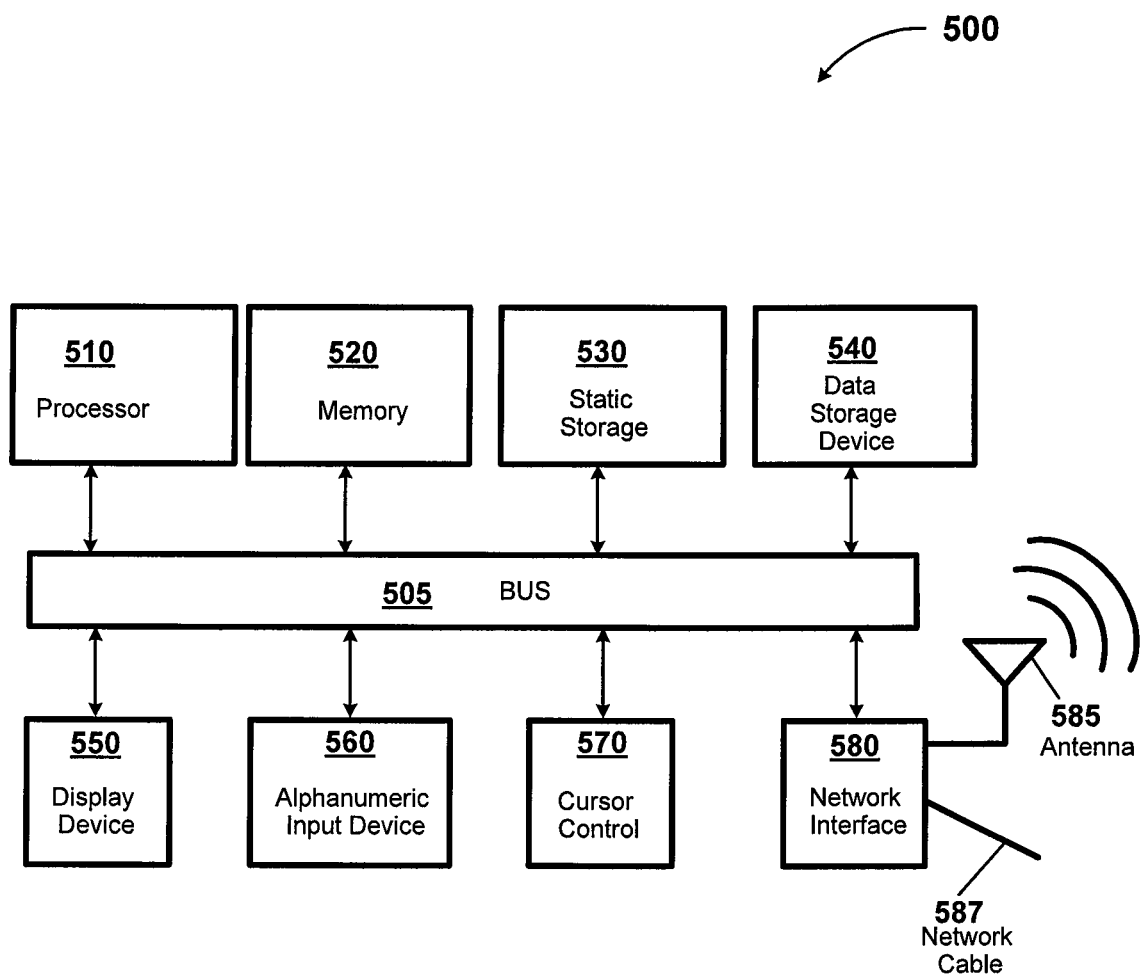
FIG. 5 is a block diagram of an electronic system, which may be used to implement embodiments described herein.

FIG. 5 is a block diagram of an electronic system, which may be used to implement embodiments described herein. System 500 is intended to represent a range of electronic systems (either wired or wireless) including, for example, desktop computer systems, laptop computer systems, personal computers (PC), wireless telephones, personal digital assistants (PDA) including cellular-enabled PDAs, set top boxes, pocket PCs, tablet PCs, DVD players, medical devices described herein, or servers, but is not limited to these examples and may include other electronic systems. Alternative electronic systems may include more, fewer and/or different components. In one embodiment, electronic system 500 depicts other alternative features of devices 102, 104, 202, 204, 302, and 304 described herein.

Electronic system 500 may include bus 505 or other communication device to communicate information, and processor 510 coupled to bus 505 that may process information. While electronic system 500 may be illustrated with a single processor, system 500 may include multiple processors and/or co-processors. In an embodiment, processor 510 includes device association logic 106 or device association logic 112 as described herein. System 500 may also include random access memory (RAM) or other storage device 520 (may be referred to as memory), coupled to bus 505 and may store information and instructions that may be executed by processor 510.

Memory 520 may also be used to store temporary variables or other intermediate information during execution of instructions by processor 510. Memory 520 is a flash memory device in one embodiment.

System 500 may also include read only memory (ROM) and/or other static storage device 530 coupled to bus 505 that may store static information and instructions for processor 510. Data storage device 540 may be coupled to bus 505 to store information and instructions. Data storage device 540 such as a magnetic disk or optical disc and corresponding drive may be coupled with electronic system 500.

Electronic system 500 may also be coupled via bus 505 to display device 550, such as a cathode ray tube (CRT) or liquid crystal display (LCD), to display information to a user. Alphanumeric input device 560, including alphanumeric and other keys, may be coupled to bus 505 to communicate information and command selections to processor 510. Electronic system 500 may include another type of user input device comprising cursor control 570, such as a mouse, a trackball, or cursor direction keys to communicate information and command selections to processor 510 and to control cursor movement on display 550.

Electronic system 500 further may include one or more network interfaces 580 to provide access to a network, such as a local area network. Network interface 580 may include, for example, a wireless network interface having antenna 585, which may represent one or more antennae. Network interface 580 may also include, for example, a wired network interface to communicate with remote devices via network cable 587, which may be, for example, an Ethernet cable, a coaxial cable, a fiber optic cable, a serial cable, or a parallel cable.

In one embodiment, network interface 580 may provide access to a local area network, for example, by conforming to an Institute of Electrical and Electronics Engineers (IEEE) standard such as IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999, as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003, as well as related documents. Bluetooth protocols are described in "Specification of the Bluetooth System: Core, Version 1.1," published Feb. 22, 2001, by the Bluetooth Special Interest Group, Inc. Previous or subsequent versions of the Bluetooth standard may also be supported.

In addition to, or instead of, communication via wireless LAN standards, network interface(s) 580 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In an embodiment, a system 500 includes one or more omnidirectional antennae 585, which may refer to an antenna that is at least partially omnidirectional and/or substantially omnidirectional, and a processor 510 coupled to communicate via the antennae.

In one or more embodiments, the operations discussed herein with respect to FIGS. 1-5 may be implemented as hardware such as logic circuitry, software, firmware, or combinations thereof, which may comprise a computer program product including, for example, a machine-readable storage medium having executable instructions that enable the machine to perform the actions in the specified process. An article of manufacture is also described; the article of manufacture includes a storage medium having instructions stored thereon that, if executed, result in the actions or operations described herein. The machine-readable storage medium may include storage mediums already described. Additionally, such computer-related medium may be downloaded as a computer program product, wherein the program may be transferred from a remote computer to a requesting computer by way of data signals embodied in a carrier wave or other propagation medium via a communication link such as a bus, a modem, or a network connection.

The above description of illustrated embodiments, including what is described in the Abstract, is not intended to be exhaustive or to limit to the precise forms disclosed. While specific embodiments and examples are described herein for illustrative purposes, various equivalent modifications are possible within the scope of this description, as those skilled in the relevant art will recognize.

These modifications can be made in light of the above detailed description. The terms used in the following claims should not be construed to limit the scope to the specific embodiments disclosed in the specification and the claims. Rather, the scope of the embodiments disclosed herein is to be determined by the following claims, which are to be construed in accordance with established doctrines of claim interpretation.

What is claimed is:

1. An apparatus, comprising:
   a first device comprising an accelerometer capable of detecting a vibration as a common event; and
   a second device comprising a microphone capable of detecting the vibration signal as the common event, the accelerometer of the first device and the microphone of the second device to form an out-of-band (OOB) channel for secure association between the first device and the second device.

2. An apparatus according to claim 1, wherein the OOB channel allows secure exchange of information between the first device and the second device to generate a common key for encrypting data to be transferred between the first device and the second device.

3. An apparatus according to claim 1, wherein the accelerometer and the microphone form a shared secret by simultaneously sensing a signal of motion and sound using the accelerometer and the microphone.

4. An apparatus according to claim 1, wherein the accelerometer and the microphone form a shared secret by bumping the accelerometer and the microphone together one or more times or bumping the accelerometer sufficiently near the microphone one or more times, or combinations thereof.

5. An apparatus according to claim 2, wherein the data to be transferred between the first and the second device comprises healthcare related data, entertainment related data, education related data, mobile computing related data, or telecommunication related data, or combinations thereof, over a wireless channel.

6. A method, comprising:
   establishing a shared secret between a first device comprising a vibration actuator capable of generating a vibration signal or an accelerometer capable of detecting a vibration signal as a common event and a second device comprising a microphone; and
   authenticating the first device or the second device using an out-of-band (OOB) channel formed by the vibration signal or the accelerometer between the first device and the microphone of the second device.

7. A method according to claim 6, wherein establishing the shared secret between the first device and the second device or authenticating the first device or the second device, or combinations thereof, comprises using the OOB channel formed between the vibration actuator of the first device and the microphone of the second device.

8. A method according to claim 7, wherein the vibration actuator of the first device and the microphone of the second device are in sufficiently close proximity to one another to form the OOB channel by sending one or more signals from the vibration actuator and detecting the one or more signals using the microphone.

9. A method according to claim 6, wherein establishing the shared secret between the first device and the second device or authenticating the first device or the second device, or combinations thereof, comprises using the OOB channel formed between the sensor of the first device and the microphone of the second device.

10. A method according to claim 9, wherein the accelerometer and the microphone form the OOB channel by sensing a signal using the accelerometer and the microphone.

11. A method according to claim 9, wherein the accelerometer and the microphone form the OOB channel by bumping the accelerometer and the microphone together or bumping the accelerometer sufficiently near the microphone one or more times, or combinations thereof.

12. A method according to claim 6, further comprising:
   exchanging discovery information between the first device and the second device prior to establishing the shared secret between the first device and the second device.

13. A method according to claim 6, further comprising:
   generating a session key to encrypt data transferred between the first device and the second device.

14. A method according to claim 13, wherein the data transferred between the first device and the second device comprises healthcare related data, entertainment related data, education related data, mobile computing related data, or telecommunication related data, or combinations thereof.

* * * * *